United States Patent
Chang et al.

(10) Patent No.: US 10,862,299 B2
(45) Date of Patent: Dec. 8, 2020

(54) ELECTRICAL PROTECTION DEVICE FOR MECHANICAL EQUIPMENT

(71) Applicant: HIWIN TECHNOLOGIES CORP., Taichung (TW)

(72) Inventors: Shun-Kai Chang, Taichung (TW); Yen-Shun Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 268 days.

(21) Appl. No.: 16/000,728

(22) Filed: Jun. 5, 2018

(65) Prior Publication Data
US 2019/0372338 A1    Dec. 5, 2019

(51) Int. Cl.
*H02H 9/04*    (2006.01)

(52) U.S. Cl.
CPC .............. *H02H 9/04* (2013.01); *H02H 9/041* (2013.01)

(58) Field of Classification Search
CPC .. H02H 9/00; H02H 9/02; H02H 9/04; H02H 9/041; H02H 9/042; H02H 9/046; H02H 9/005; H01L 27/0248; H01L 27/0251; H01L 27/0266; H01C 8/04; H01C 7/12
USPC ................ 361/111, 119, 18, 56, 86
See application file for complete search history.

(56) References Cited

U.S. PATENT DOCUMENTS

| | | | | |
|---|---|---|---|---|
| 4,246,622 A | * | 1/1981 | Hosoda .................. | H02H 7/085 361/31 |
| 5,610,793 A | * | 3/1997 | Luu ........................ | H02H 9/042 361/111 |
| 5,625,521 A | * | 4/1997 | Luu ........................ | H02H 9/042 361/111 |
| 6,816,352 B2 | * | 11/2004 | Hoopes .................. | H02H 9/042 361/103 |
| 8,284,536 B2 | * | 10/2012 | Minarczyk ........... | H05B 41/292 361/118 |
| 8,493,680 B2 | * | 7/2013 | Oh .......................... | G11B 5/09 360/46 |

(Continued)

FOREIGN PATENT DOCUMENTS

| | | |
|---|---|---|
| CN | 201130855 Y | 10/2008 |
| DE | 102017125802 A1 | 5/2018 |

(Continued)

*Primary Examiner* — Yemane Mehari
(74) *Attorney, Agent, or Firm* — Muncy, Geissler, Olds & Lowe, P.C.

(57) ABSTRACT

An electrical protection device used in a controller of a mechanical equipment is disclosed to include a circuit board, and a pre-stage protection circuit and a post-stage protection circuit formed on the circuit board. The pre-stage protection circuit connects a power supply and a pre-stage of the controller, providing an electrical protection condition such that when a transient surge energy of the power supply surpasses the electrical protection condition, the pre-stage protection circuit blocks the transient surge energy from entering the controller. The post-stage protection circuit connects pre-stage protection circuit and a post-stage of the controller. Further, when the transient surge energy occurs, a response speed of the post-stage protection circuit is slower than that of the pre-stage protection circuit. The electrical protection device of the invention effectively blocks transient surge energy, avoiding electronic system component damage of the mechanical equipment.

10 Claims, 5 Drawing Sheets

(56) References Cited

U.S. PATENT DOCUMENTS

| | | | | |
|---|---|---|---|---|
| 8,576,525 B2* | 11/2013 | Wang | .................... | H02H 9/042 |
| | | | | 361/56 |
| 2007/0252565 A1 | 11/2007 | Wang et al. | | |
| 2010/0148577 A1* | 6/2010 | Cheng | ....................... | B60L 7/10 |
| | | | | 307/9.1 |
| 2016/0322810 A1* | 11/2016 | Bishop | ................... | H02H 9/041 |
| 2019/0148936 A1* | 5/2019 | Hsin | ..................... | H02H 9/042 |
| | | | | 361/56 |

FOREIGN PATENT DOCUMENTS

| JP | 2007-306789 A | 11/2007 |
|---|---|---|
| KR | 10-2013-0092091 A | 8/2013 |
| KR | 10-2016-0060728 A | 5/2016 |
| TW | M372033 U1 | 1/2010 |
| TW | M454663 U1 | 6/2013 |
| TW | 201611484 A | 3/2016 |
| TW | M521872 U | 5/2016 |

* cited by examiner

ELECTRICAL PROTECTION DEVICE FOR MECHANICAL EQUIPMENT

BACKGROUND OF THE INVENTION

1. Field of the Invention

The present invention relates to electrical protection technology and more particularly, to an electrical device for mechanical equipment.

2. Description of the Related Art

A controller is a device used to control the operation of an automation or mechanical equipment, such as processing, measurement, and transportation. The operation process usually includes a variety of different itineraries, such as rotation, movement, and grabbing. A controller completes various strokes and operations through programs or instructional arrangements.

During the operation of a controller, the power energy may be suddenly affected by the surrounding equipment, environmental equipment, power line sensing, lightning, and power contacts to produce a transient surge. The transient surge enters the controller with the power supply path, causing damage to the controller or the terminal load.

At present, in order to prevent transient surge damage, the corresponding protection circuit or protection device is usually designed based on the response of the electronic components in the controller. However, this method requires full consideration of the response conditions of all electronic components in the controllers. In addition, electronic components of the same specifications can also cause errors in the response capability due to parameter errors. Therefore, it is difficult to design the protection device.

Further, the available space inside each mechanical equipment is limited, so the space that the protection circuit can use is usually narrow. Therefore, how to select suitable protection devices in this narrow space has become a problem that needs to be solved in the industry.

SUMMARY OF THE INVENTION

The present invention has been accomplished under the circumstances in view. It is the main object of the present invention to provide an electrical protection device for mechanical equipment, which allows neglect of the response of the electronic components in the system of the mechanical equipment, and effectively isolate the damage caused by transient surges.

To achieve this and other objects of the present invention, an electrical protection device is used in a controller of a mechanical equipment, comprising a circuit board, a pre-stage protection circuit and a post-stage protection circuit. The pre-stage protection circuit and the post-stage protection circuit are formed on the circuit board. The pre-stage protection circuit connects a power supply and a pre-stage of the controller. The pre-stage protection circuit provides an electrical protection condition such that when a transient surge energy of the power supply surpasses the electrical protection condition, the pre-stage protection circuit blocks the transient surge energy from entering the controller. The post-stage protection circuit connects the pre-stage protection circuit and a post-stage of the controller. When the transient surge energy occurs, the response speed of the post-stage protection circuit is slower than the response speed of the pre-stage protection circuit upon.

Through the arrangement of the pre-stage protection circuit and the post-stage protection circuit, the response of the post-stage protection circuit is delayed when a transient surge energy occurs, therefore, the electrical protection device of the present invention can ignore the electronic components of the controller or the load that have a faster response than the pre-stage protection circuit, simplifying the design of the protection circuit and effectively blocking transient surge energy.

Other advantages and features of the present invention will be fully understood by reference to the following specification in conjunction with the accompanying drawings, in which like reference signs denote like components of structure.

DETAILED DESCRIPTION OF THE INVENTION

The electrical protection device, referenced by 10, of the present invention is a controller applied to a mechanical device, such as a robot, an electric gripper, a slide rail, etc.

Figure 1:
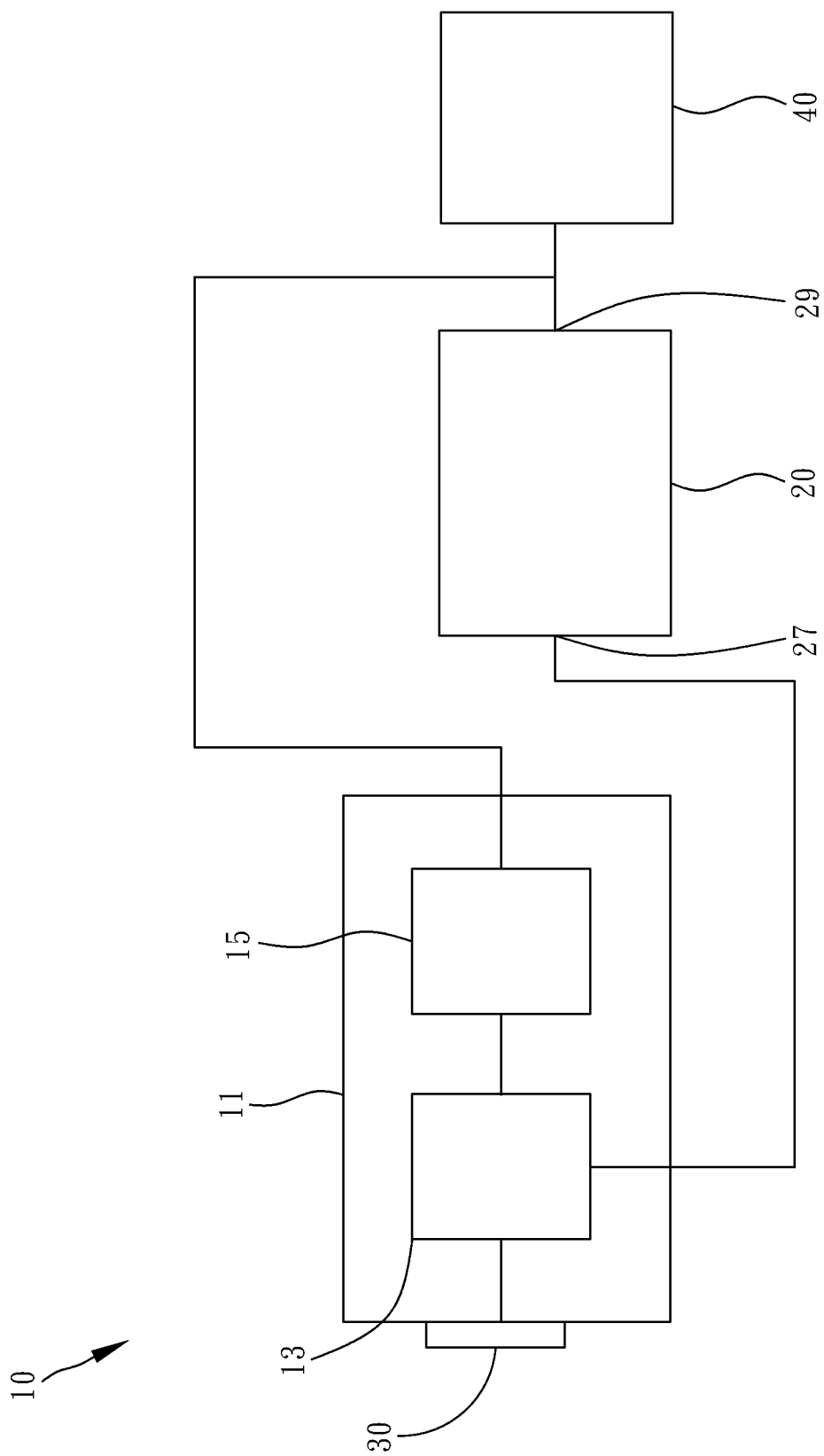
FIG. 1 is a block diagram of an electrical protection device for mechanical equipment in accordance with the present invention.

Referring to FIG. 1, the electrical protection device 10 connects a controller 20 and a power supply 30 to prevent the instantaneous surge energy generated by the power supply or the power lines from damaging the electronic components inside the controller 20 or the mechanical device. The load, referenced by 40, is an executing device of the mechanical device, such as an electric gripper, guideway, etc.

Figure 2:
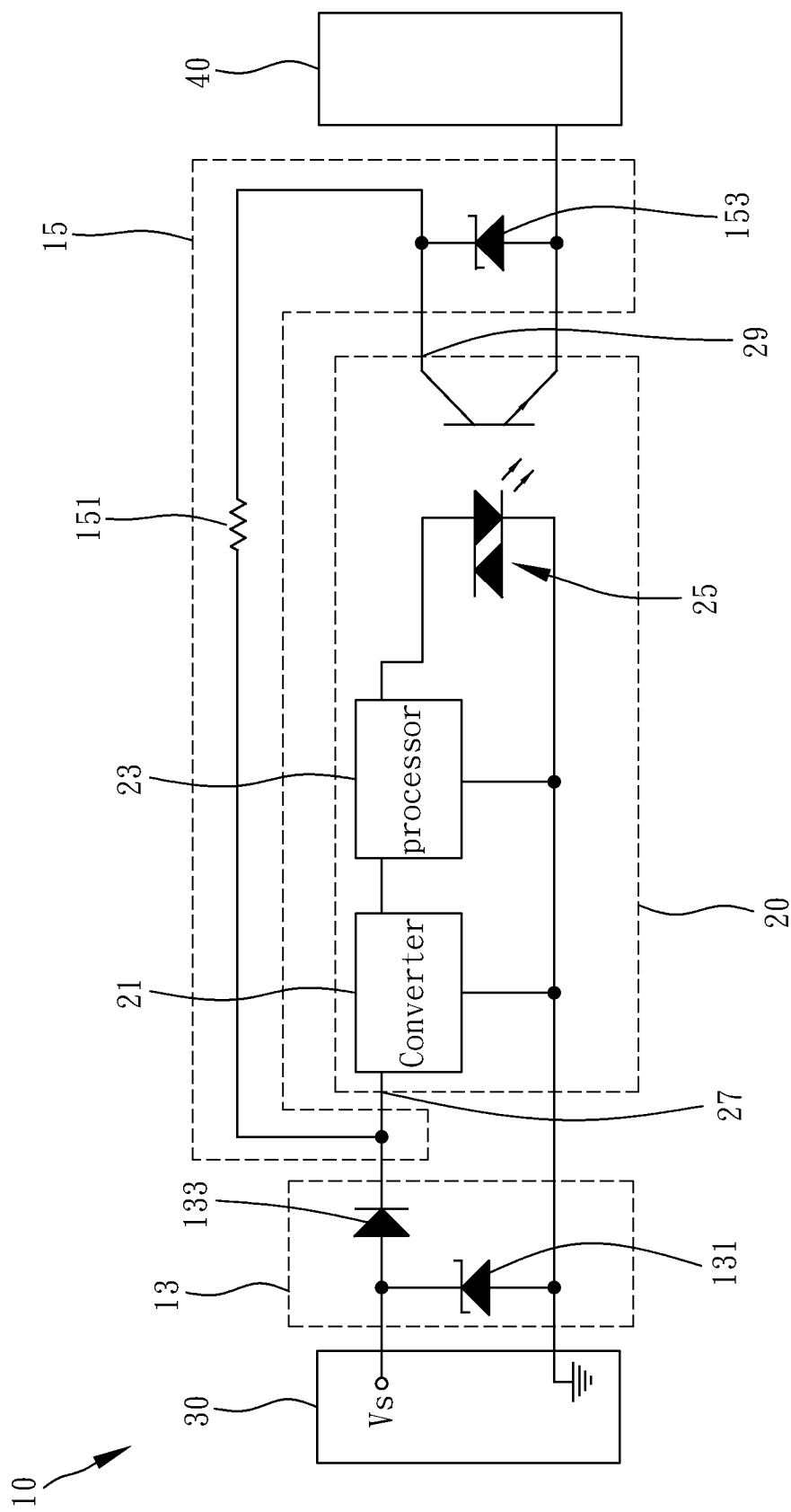
FIGS. 2-5 are circuit diagrams of the electrical protection device in accordance with the present invention.

Referring to FIG. 2 and FIG. 1 again, the controller 20 comprises a converter 21, a processor 23 and a photo relay 25. The converter 21 connects the electrical protection device 10 and receives the power energy through the electrical protection device 10. The processor 23 connects the converter 21 and the photo relay 25 and is used to output a control command of the load 40, or to receive a feedback signal from the load 40. In other embodiments, the controller 20 further comprises other modules, such as rectifier, inverter and etc., or more processors.

The electrical protection device 10 comprises a circuit board 11, a pre-stage protection circuit 13 and a post-stage protection circuit 15. The pre-stage protection circuit 13 and the post-stage protection circuit 15 are formed on the circuit board 11. The bonding surface of the circuit board 11 is preferably 21*50 mm, and the circuit board can be a single-layer or multi-layer conductor structure. The bonding surface is for carrying electronic components. In other embodiments, the size of the circuit board may be smaller or larger. For example, the long side of the bonding surface is changed to 50-85 mm, and the short side of the bonding surface is changed to 21-35 mm. Therefore, the size of the circuit board is not limited to the above. Further, the long and short sides can also be the same size. The pre-stage protection circuit 13 connects the power supply 30 and the pre-stage 27 of the controller 20. The post-stage protection circuit 15 connects the pre-stage protection circuit 13 and the of the controller 20 的 post-stage 29. The pre-stage 27 and the post-stage 29 refer to the input and output of the controller 20 respectively. The post-stage 29 of the controller 20 generally refers to the end of the connection to the load 40 to output instructions to the load. Therefore, the pre-stage 27 and post-stage 29 of the controller 20 are also referred to as the input terminal and the output terminal.

The pre-stage protection circuit 13 blocks the transient surge energy from inputting into the controller 20 when the surge power at the input of the power supply 30 meets the electrical protection condition. The electrical protection condition of this embodiment is ±1 kilovolt (KV). In other words, when the transient surge energy exceeds ±1 kV, the pre-stage protection circuit 13 will be triggered. In other embodiments, the parameters of the electrical protection condition may be larger or smaller. The transient surge energy can be divided into forward transient surge energy and reverse transient surge energy. The forward direction refers to the energy flowing from a high potential to a low potential, and the reverse refers to the energy flowing from a low potential to a high potential. Surge is a transient or momentary surge of energy that causes the system to fail to load. Electrical protection conditions include forward protection parameters and reverse protection parameters, where energy and parameters can be current, voltage, power, or digital parameters that are converted by operations.

In conformity with the electrical protection conditions, the transient surge energy is greater than the forward protection parameter and less than the reverse protection parameter. When the transient surge energy is greater than the forward protection parameter, the pre-stage protection circuit 13 directs the transient surge energy to the ground terminal in a short-circuit manner to avoid transient surge energy from entering the controller 20. When the transient surge energy is less than the reverse protection parameter, the pre-stage protection circuit 13 blocks the transient surge energy outside the controller 20 in a disconnected manner to avoid transient surge energy entering the controller 20.

The pre-stage protection circuit 13 comprises a pre-stage voltage suppressor 131 and a high voltage diode 133. The pre-stage voltage suppressor 131 and the power supply 30 are connected in parallel. The positive electrode of the high voltage diode 133 is connected to the positive electrode of the pre-stage voltage suppressor 131. The negative electrode of the high voltage diode 133 is connected to the post-stage protection circuit 15 and the pre-stage 27 of the controller 20. The forward protection parameter has a great concern with the pre-stage voltage suppressor 131. In this embodiment, the pre-stage voltage suppressor 131 is a transient voltage suppression diode (TVS). The transient voltage suppression diode is preferably a bidirectional 24 volt and can withstand 300 amps (A)/3 kW (KW). The high voltage diode is better selected with a withstand voltage of 1 kV (KV), but other embodiments are not limited to the selected parameters. The pre-stage voltage suppressor 131 of other embodiments may be a metal oxide varistor (MOV) or other electronic component or combination capable of withstanding transient surge energy.

The response speed of the post-stage protection circuit 15 is slower than that of the pre-stage protection circuit 13 when a transient surge energy occurs. The post-stage protection circuit 15 is also used to prevent external static electricity from entering the controller 20. The impedance of the post-stage protection circuit 15 is greater than that of the pre-stage protection circuit 13 to delay the response of the post-stage protection circuit 15 when the transient surge energy is greater than the forward protection parameter. When the transient surge energy is less than the reverse protection parameter, an open circuit is formed between the pre-stage protection circuit 13 and the post-stage protection circuit 15 to delay the response of the post-stage protection circuit 15.

In this embodiment, the post-stage protection circuit 15 comprises a shunt component 151 and post-stage voltage suppressor 153. The shunt component 151 is the main reason for the slow response of the post-stage protection circuit 15 when transient surge energy occurs. Here, take a resistor as an example. The resistor has the opposite ends connected to the negative electrode of the high voltage diode 133 of the pre-stage protection circuit 13 and the post-stage voltage suppressor 153. The post-stage voltage suppressor 153 connects the post-stage 29 of the controller 20, creating a parallel relationship.

The shunt component 151 is adapted to delay the response time of the post-stage voltage suppressor 153 for protecting the post-stage voltage suppressor 153 and the photo relay 25 when a transient surge energy occurs. When a transient surge occurs, the pre-stage protection circuit 13 will react first. More particularly, when a forward transient surge energy occurs, the pre-stage voltage suppressor 131 forms an open circuit. Therefore, the impedance of the pre-stage voltage suppressor 131 is far smaller than that of the shunt component. Thus, most transient surge energy passes through the short-circuited pre-stage voltage suppressor 131 and does not enter the controller 20 or the post-stage protection circuit.

The components used in the post-stage voltage suppressor 153 are the same as those of the pre-stage voltage suppressor 131, but the parameters of the components such as the withstand voltage and the response time may be different.

Because the circuit board 10 selected in this embodiment is small, the size of the transient voltage suppression diode is 8*5.9*2.6 mm or 2.6*1.3*1.1 mm, and the size of the high voltage diode is 5*2.7*2.2 mm, but the component size may be smaller or larger, but it needs to be configured on the circuit board 10. The resistance of the resistor is between 20-60 ohms (Ω). In this way, the components of the electrical protection device 10 of the present invention can be completely configured on the circuit board 11 to be incorporated into the mechanical equipment.

In application, when the power energy generates a transient surge energy, it is divided into forward and reverse surge energy. The forward transient surge energy will trigger the pre-stage voltage suppressor 131 of the pre-stage protection circuit 13, thereby conducting the pre-stage voltage suppressor 131 to form a short circuit. Thus, the forward transient surge energy will go through the short-circuited pre-stage voltage suppressor 131 to earth without entering the controller 20. When a reverse transient surge energy goes through the power supply 30 or the power lines into the electrical protection device 10, the reverse transient surge energy passes through the pre-stage voltage suppressor 131, due to that the high voltage diode 133 is in an open circuit status, the reverse transient surge energy cannot enter the controller. Thus, the pre-stage protection circuit 13 can effectively protect the controller 20, preventing the controller 20 from being damaged by the forward or reverse transient surge energy.

Further, since the pre-stage voltage suppressor 131 and the post-stage voltage suppressor 153 are selected from quick response elements, in order to prevent the post-stage voltage suppressor 153 from reacting earlier than the pre-stage voltage suppressor 131, the functioning of the shunt component 151 of the post-stage protection circuit 15 can effectively delay the response of the post-stage voltage suppressor 153, avoiding the controller 20 or post-stage voltage suppressor 153 from damage.

Further, the post-stage voltage suppressor 153 can effectively block the static voltage generated by the load 40 to protect the photo relay 25 of the controller 20.

Through the arrangement of the pre-stage protection circuit 13 and the post-stage protection circuit 15, the electrical protection device of the present invention can ignore the electronic components of the controller 20, the load 40 or other system that react faster than the pre-stage voltage suppressor 131, simplifying the design of the protection circuit and effectively blocking transient surge energy.

Figure 3:
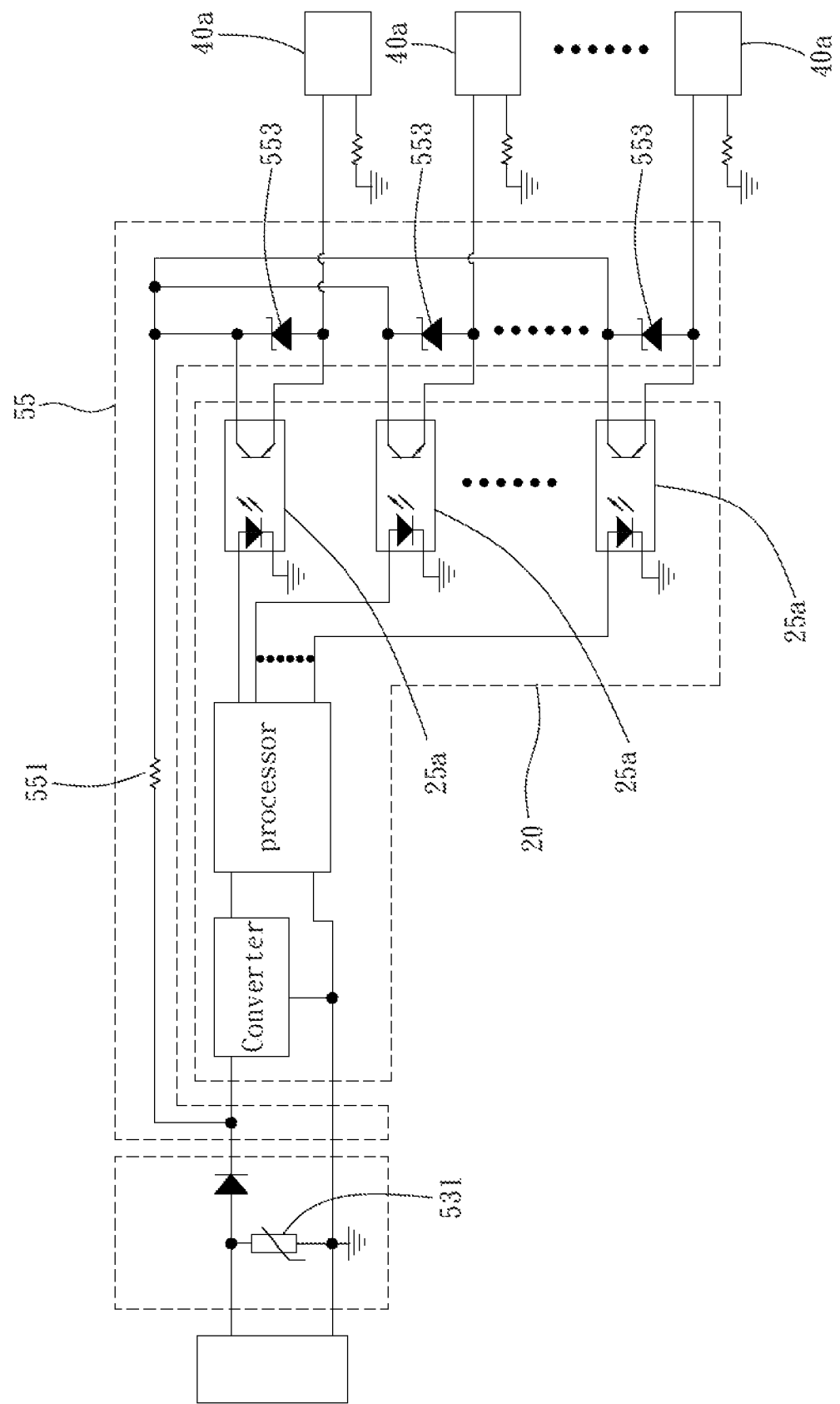

As shown in FIG. 3, the figure is another embodiment of the electrical protection device of the present invention. The interval black dots in the figure indicate that the number of lines or elements may be more. In the drawing, light reference signs indicate like components. The pre-stage voltage suppressor 531 in this embodiment is a metal oxide varistor (MOV). It can be achieved to present controller 20 from being damaged by a transient surge energy. The metal oxide varistor can handle large currents, absorb surge energy, and react quickly to protect the controller 20. In other embodiments, the pre-stage voltage suppressor 531 may also use other electronic components capable of withstanding or absorbing transient surge energy, instead of being described in this specification.

Further, the controller 20 has multiple outputs corresponding to multiple photo relays 25a. The post-stage protection circuit 55 comprises only one single shunt component (i.e., resistor) 551, however, it comprises a plurality of post-stage voltage suppressors 553. The post-stage voltage suppressors 553 connect the photo relays 25a in parallel to in a one-to-one manner and also connect multiple loads 40a.

Thus, the electrical protection device can delay the response of the multiple post-stage voltage suppressors 553 through one single shunt component 551.

Figure 4:
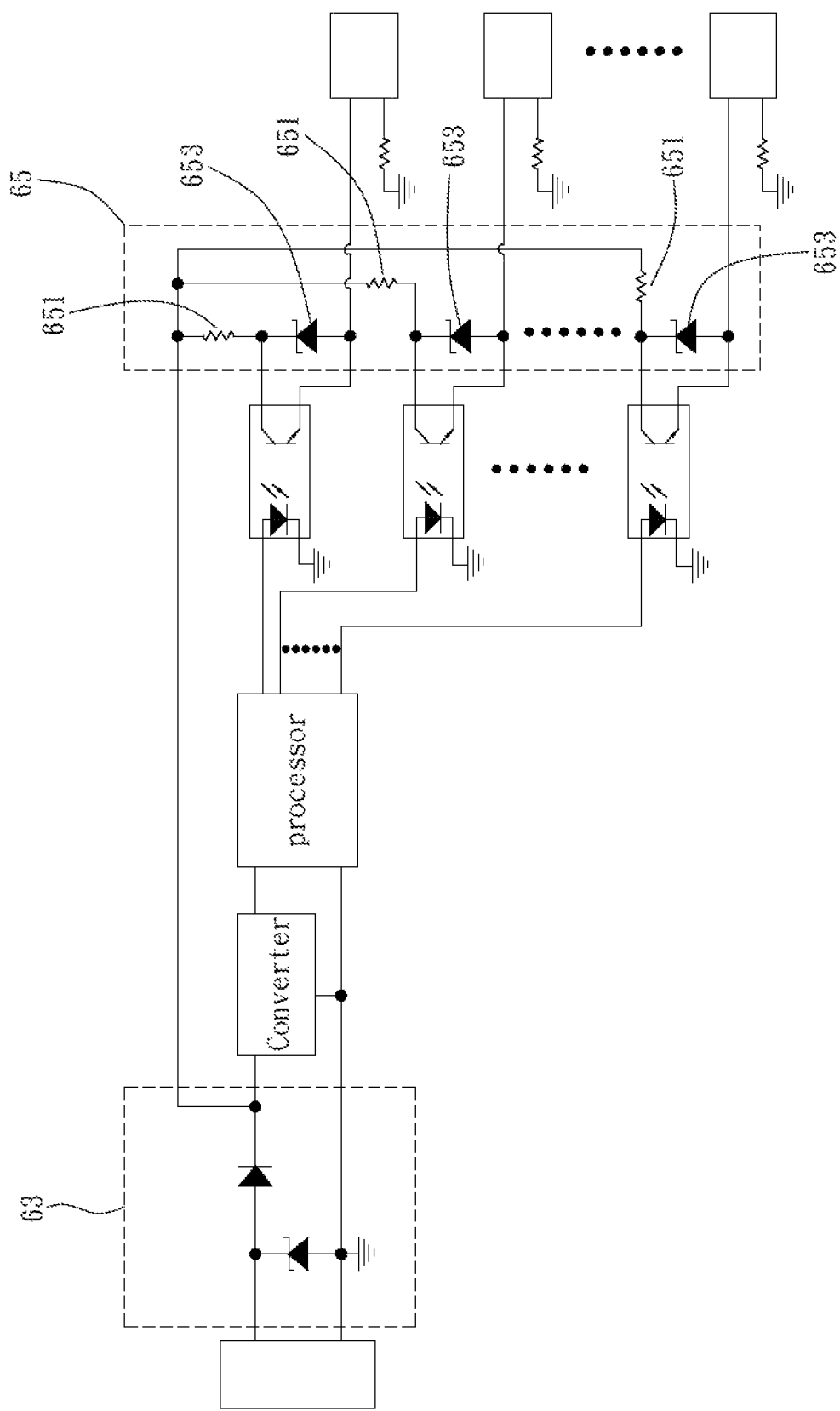

FIG. 4 illustrates still another embodiment of the electrical protection device of the present invention, wherein like reference signs denote like component parts. In this embodiment, the resistors of the shunt components 651 of the post-stage protection circuit 65 are connected to the pre-stage protection circuit 63. The number of the resistors is proportional to the number of the post-stage voltage suppressor 653 in a one-to-one configuration. These resistors can be configured to have the same resistance value or different resistance values according to actual circuit design. Thus, the response time of the post-stage voltage suppressors 653 may be the same or different.

Figure 5:
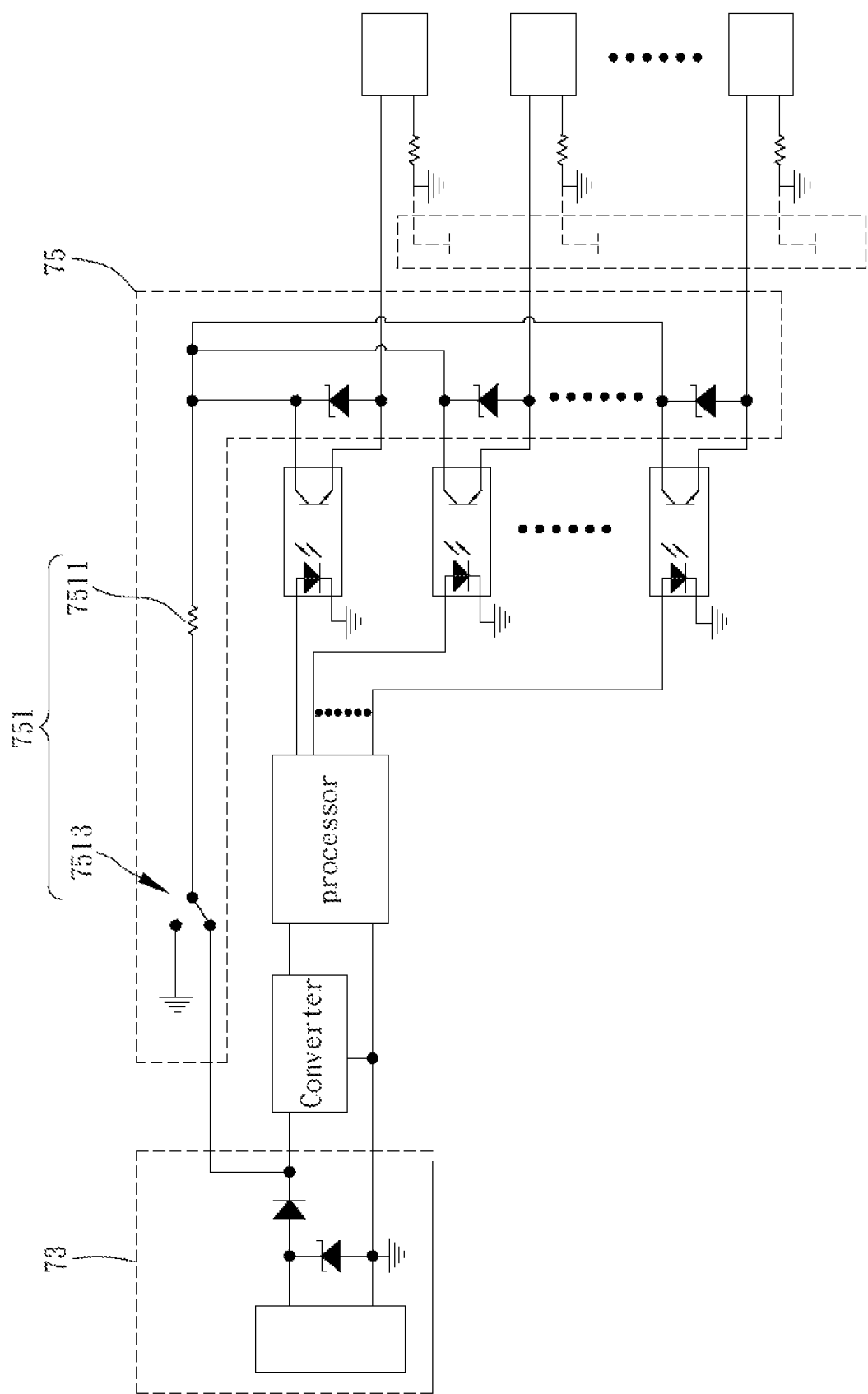

FIG. 5 illustrates still another embodiment of the electrical protection device of the present invention, wherein like reference signs denote like component parts. In this embodiment, the shunt component 751 of the post-stage protection circuit 75 includes a resistor 7511 and a switch 7513. The switch 7513 connects the pre-stage protection circuit 73, the ground terminal and the resistor 7511, wherein the connection of the resistor 7511 is same as the aforesaid embodiments.

The switch 7513 can use a mechanical switch or an electronic switch. A mechanical switch can be, for example, a relay. An electronic switch, can be, for example, a switch circuit consisting of a transistor or a transistor. The switch 7513 can choose to interrupt the connection path between the post-stage voltage suppressor and the high voltage diode so that the path is open or directly connected to the ground.

When the switch is switched between the post-stage voltage suppressor and the high voltage diode, the current provided to the load is provided by the power supply. This state is also referred to as the sourcing mode. When the switch switches the connection path between the post-stage voltage suppressor and the ground of the switch, that is, the post-stage voltage suppressor is shorted to the ground (0V). At this time, the current supplied to the load is supplied from load and that flows through the post-stage voltage suppressor to ground. This state is called sinking mode.

Thus, the electrical protection device of the present invention can effectively isolate or absorb the transient surge energy generated by the power supply or power line, so as to avoid the transient surge energy damaging the electronic components inside the mechanical equipment. Further, the electrical protection device does not need to consider the electrical characteristics of the electronic components in the mechanical equipment. Through the pre-stage protection circuit, the electrical protection device can effectively block most transient surge energy from entering the controller or other component parts of the mechanical equipment.

What is claimed is:

1. An electrical protection device used in a controller of a mechanical equipment, comprising:
    a circuit board;
    a pre-stage protection circuit formed on said circuit board and connected with a power supply and a pre-stage of the said controller of said mechanical equipment, said pre-stage protection circuit providing an electrical protection condition such that when a transient surge energy of said power supply surpasses said electrical protection condition, said pre-stage protection circuit blocks said transient surge energy from entering the said controller of said mechanical equipment; and
    a post-stage protection circuit formed on said circuit board and connected with said pre-stage protection circuit and a post-stage of the said controller of said mechanical equipment, a response speed of said post-stage protection circuit being slower than a response speed of said pre-stage protection circuit upon occurrence of said transient surge energy.

2. The electrical protection device as claimed in claim 1, wherein said pre-stage protection circuit comprises a pre-stage voltage suppressor and a high voltage diode, said pre-stage voltage suppressor being connected in parallel with said power supply to block the forward said transient surge energy from entering the said controller of said mechanical equipment, said high voltage diode connected said pre-stage voltage suppressor and said post-stage protection circuit to block the reverse said transient surge energy from entering the said controller of said mechanical equipment.

3. The electrical protection device as claimed in claim 2, wherein said pre-stage voltage suppressor is selectively a transient voltage suppression diode (TVS) or a metal oxide varistor (MOV).

4. The electrical protection device as claimed in claim 1, wherein said electrical protection condition comprises a forward protection parameter and a reverse protection parameter; when said transient surge energy is larger than said forward protection parameter, the impedance of said post-stage protection circuit is greater than the impedance of said pre-stage protection circuit to delay the response speed of said post-stage protection circuit; when said transient surge energy is smaller than said reverse protection parameter, an open circuit is formed between said pre-stage protection circuit and said post-stage protection circuit to delay the response speed of said post-stage protection circuit.

5. The electrical protection device as claimed in claim 4, wherein said post-stage protection circuit comprises a shunt component and a post-stage voltage suppressor, said shunt component connected said pre-stage protection circuit and said post-stage voltage suppressor, said shunt component having an impedance value, said post-stage voltage suppressor connected the said post-stage of the said controller of said mechanical equipment.

6. The electrical protection device as claimed in claim 5, wherein said shunt component comprises a resistor; said post-stage voltage suppressor is selectively a transient voltage suppression diode (TVS) or a metal oxide varistor (MOV).

7. The electrical protection device as claimed in claim 5, wherein said shunt component comprises a switch and a resistor, said switch connected said pre-stage protection circuit and said resistor, said resistor connected said post-stage voltage suppressor.

8. The electrical protection device as claimed in claim 4, wherein said post-stage protection circuit comprises a plurality of shunt components and a plurality of post-stage voltage suppressors, said shunt components connected said pre-stage protection circuit and said post-stage voltage suppressors, each said shunt component having an impedance value, said post-stage voltage suppressors connected a plurality of post-stages of the said controller of said mechanical equipment.

9. The electrical protection device as claimed in claim 8, wherein said shunt components each comprise a plurality of resistors; each said post-stage voltage suppressor is selectively a transient voltage suppression diode (TVS) or a metal oxide varistor (MOV).

10. The electrical protection device as claimed in claim 1, wherein said bonding surface of said circuit board comprising a short side and a long side, said short side being between 21-35 mm, said long side being between 50-85 mm.

* * * * *